A. A. GAGARIN.
CENTER BEARING.
APPLICATION FILED NOV. 6, 1919.
1,384,187.
Patented July 12, 1921.
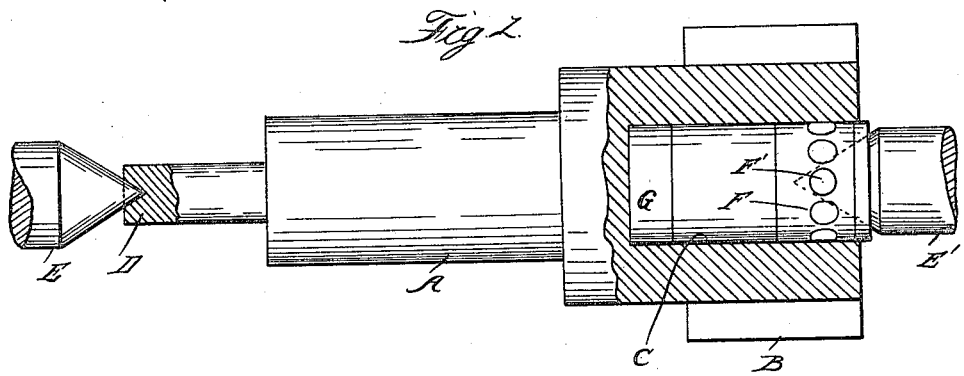
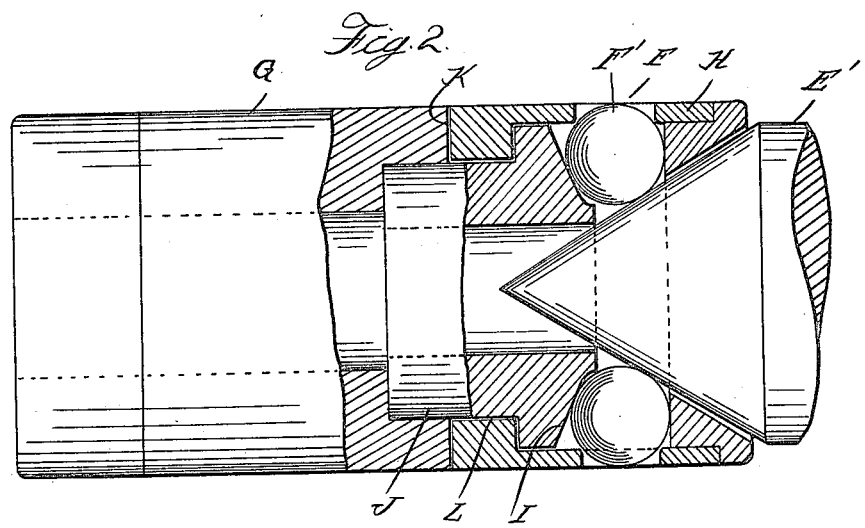
Inventor
Andrew A. Gagarin
By Whittemore, Hulbert & Whittemore
Attorneys

UNITED STATES PATENT OFFICE.

ANDREW A. GAGARIN, OF DETROIT, MICHIGAN, ASSIGNOR TO THE GEAR GRINDING MACHINE COMPANY, OF DETROIT, MICHIGAN, A CORPORATION OF MICHIGAN.

CENTER-BEARING.

1,384,187.  Specification of Letters Patent.  Patented July 12, 1921.

Application filed November 6, 1919. Serial No. 336,207.

*To all whom it may concern:*

Be it known that I, ANDREW A. GAGARIN, a citizen of the United States of America, residing at Detroit, in the county of Wayne and State of Michigan, have invented certain new and useful Improvements in Center-Bearings, of which the following is a specification, reference being had therein to the accompanying drawings.

The invention relates to that class of mechanical operations in which the work to be machined, ground, or otherwise fashioned, is mounted upon centers. It has long been the practice to employ centers for supporting the work, these usually engaging center bearings formed directly in the ends of the blanks. There are, however, many places where it is impossible to form direct center bearings and where it is necessary to provide auxiliary bearing members. As a specific instance, spline shafts in transmission gears are sometimes formed with recessed ends for telescopically receiving the end of the driven shaft. The depth of the recess is such that it would be inconvenient to form a center bearing at the inner end thereof and it has been the practice in the past to provide a filler plug having the center bearing at its outer end. The recess having an accurately ground inner surface and the plug being ground to fit the same, an accurate center is formed, but it is essential that this plug should have a pressed fit with the recess in order to insure its accurate placing. This involves considerable labor and expenditure of time in pressing in and withdrawing the plugs and it also necessitates the provision of a relatively large number of plugs for carrying on the work. Furthermore, it has been found that the plugs are short-lived as they wear rapidly in use, so as to lose their accuracy.

It is the object of the invention to simplify the operation and to economize time and cost by providing a center bearing which may be quickly engaged and disengaged from the blank by hand and which at the same time has a high degree of accuracy. It is a further object to obtain an anti-friction bearing which will perform its work with slight wear and which also diminishes the wear upon the supporting centers. The invention therefore comprises the novel construction as hereinafter set forth.

In the drawings:

Figure 1 is a sectional elevation showing a work blank with my improved center bearing engaged therewith and supported on the stationary center;

Fig. 2 is a longitudinal section through the bearing.

While my improvement is applicable to various kinds of work, I have described only the one specific application above referred to. A is a spline shaft having formed on one end thereof the pinion or gear wheel B and the recess C for telescopically receiving a coöperating shaft. D is a center bearing at the opposite end of the shaft and E and E' are centers for supporting the shaft while being ground or otherwise operated upon.

My improved bearing comprises a ball, or other anti-friction roller bearing F which is mounted on a plug G fitting the recess C with sufficient clearance to permit of its being engaged and disengaged by hand. The ball bearing F comprises the balls F', a retainer H therefor and an end thrust race member I. The retainer H is in the form of a cylindrical shell surrounding the balls but apertured opposite each ball to permit the same to bear radially against the face C of the recess. The end thrust race member I is of a slightly conical form and is provided with a shank J fitting within the plug G so as to be accurately centered therewith. There is also preferably a groove K in the race member I for receiving an inwardly extending portion L of the retainer, thereby holding said retainer from disengagement while permitting independent rotation thereof.

When the plug is placed in the recess C, its outer end will be in a position to engage the center E', the conical surface of which will bear against the balls and press radially outward thereon. This radial thrust is taken up by the cylindrical surface of the recess C, while the end thrust is carried through the race member I into the plug. The inner end of this plug fits against the bottom or inner end of the recess and therefore carries the end pressure directly into the shaft. Thus, in operation, the accurate centering is obtained by the spacing of the balls, which being of exactly the same diameter will hold the cylindrical surface C exactly co-axial with the conical face of the center E. While the work is revolving the balls roll about the center E, cylindrical surface C and race member I, while the retainer H revolves with the balls without material restraining pressure thereon. Therefore, the work is performed with very little wear upon the centers and none upon the plug. The wear upon the balls is so slight that they may be used for many operations, but whenever necessary, they can be quickly removed and replaced by new balls.

What I claim as my invention is:

1. The combination with a supporting center, of an anti-friction bearing therefor, the rolling members of which are adapted to contact with the work to hold the same in co-axial relation to said center.

2. The combination with a supporting center, of an anti-friction roller bearing, the rolling members of which have a radial and indirect end thrust engagement with said center, and a radial and end thrust engagement with the work to be supported thereon.

3. The combination with a supporting center, of an anti-friction roller bearing, the rolling members of which have a radial and end thrust bearing upon said center, and a radial bearing upon a trued surface of the work, and means for indirectly transmitting the end thrust of said bearing into the work.

4. The combination with a supporting center, of an anti-friction roller bearing, the rolling members of which have a radial and end thrust engagement therewith, and a radial thrust engagement with a trued surface of the work, and a member on which said bearing is mounted loosely engaging a recess in the work and transmitting end thrust from the bearing thereinto.

5. The combination with a supporting center, of an anti-friction roller bearing for engaging the same, a member on which said anti-friction bearing is mounted loosely fitting a recess in the work, said member providing direct contact of the rollers with a trued surface of the work.

6. The combination with a supporting center, of a plug member for loosely engaging a recess in the work, and a roller bearing mounted on said plug member having the rolls thereof interposed between said center and a trued surface of the work.

7. The combination with a supporting center, of a plug for loosely engaging a central recess in the work, said plug being provided with an end thrust recess member, and rollers engaging said end thrust race member and said center and also engaging a trued surface of the work.

8. The combination with a supporting center, of a plug member for loosely fitting a central recess in the work, an end thrust race member in fixed relation to said plug, a series of rollers, a retainer for said rollers revolubly engaging said plug and holding said rollers in contacting relation to said center and end thrust bearing, said retainer being cut away to provide radial contact of said rollers with a trued surface of the work.

In testimony whereof I affix my signature.

ANDREW A. GAGARIN.